April 9, 1940.  W. LINDENBERG  2,196,733
MEANS FOR ADJUSTING THE OBJECTIVE OF A PHOTOGRAPHIC
APPARATUS, PARTICULARLY A PHOTOGRAPHIC CAMERA
Filed Jan. 12, 1939  2 Sheets-Sheet 1

Wilhelm Lindenberg
Inventor by
Attorneys

April 9, 1940.  W. LINDENBERG  2,196,733
MEANS FOR ADJUSTING THE OBJECTIVE OF A PHOTOGRAPHIC
APPARATUS, PARTICULARLY A PHOTOGRAPHIC CAMERA
Filed Jan. 12, 1939  2 Sheets-Sheet 2
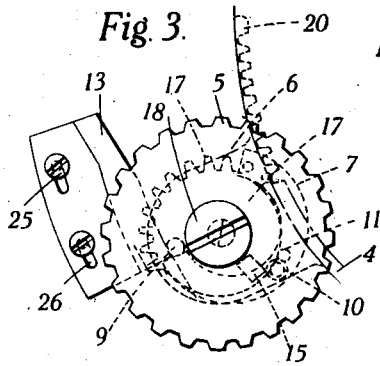
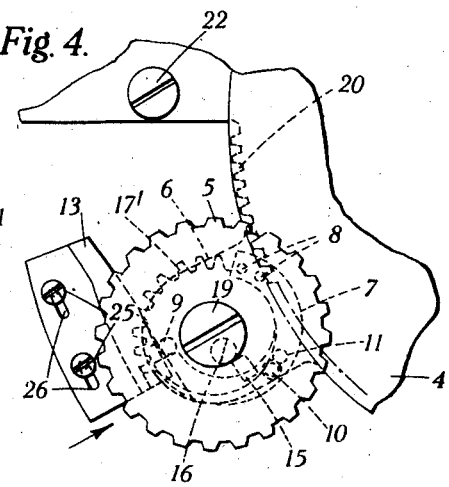
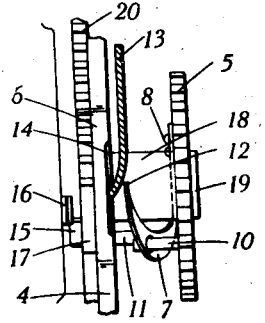
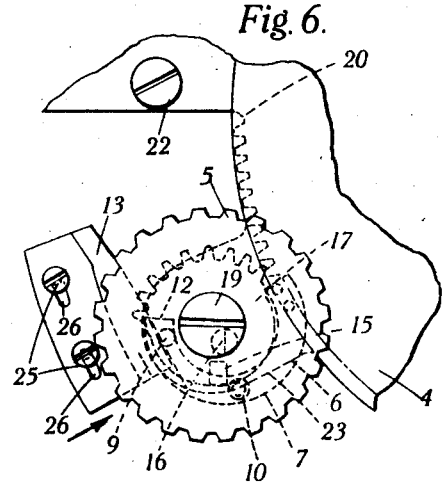
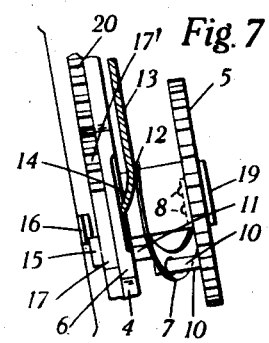
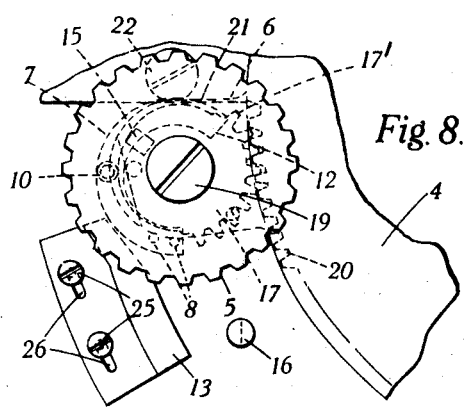
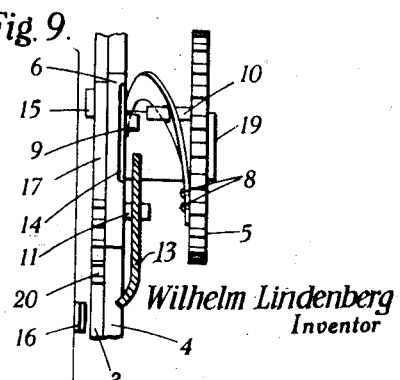
Wilhelm Lindenberg
Inventor Patented Apr. 9, 1940

2,196,733

UNITED STATES PATENT OFFICE 2,196,733

MEANS FOR ADJUSTING THE OBJECTIVE OF A PHOTOGRAPHIC APPARATUS, PARTICULARLY A PHOTOGRAPHIC CAMERA

Wilhelm Lindenberg, Stuttgart, Germany, assignor to Eastman Kodak Company, Rochester, N. Y., a corporation of New Jersey Application January 12, 1939, Serial No. 250,596
In Germany January 25, 1938

12 Claims. (Cl. 95—45)

This invention relates to a means for adjusting the objective of a photographic apparatus such as a photographic camera.

With photographic cameras at present known in which the camera objective is normally retracted or telescoped into the camera body when the camera is not in use, it is the practice for the objective to be pulled or rotated into the infinity or picture-taking position before separate means is operated for focusing the objective. These two separate operations require a certain amount of time which is often an inconvenience or disadvantage, particularly when it is necessary to position and focus the camera rapidly for taking a desired subject.

The primary object of the invention is the provision of a photographic apparatus including an objective in combination with means for adjusting the objective from an inoperative position to infinity position or position in which the apparatus is ready for use, and for thereafter adjusting the objective for focusing purposes.

Another object of the invention is to provide an operating member which may be used as a handle to move the objective from a position of rest to a picture-taking position and thereafter rotated to impart a focusing movement to the objective.

A further object of the invention is to provide a locking means which ensures that when adjusting means is being operated to effect one movement of the objective, it cannot be operated to effect another movement thereof.

Other and further objects of the invention will be apparent to those skilled in the art.

To these and other ends, the invention consists of certain parts and combinations of parts, all of which will be hereinafter described, the novel features being pointed out in the appended claims.

One example of the preferred form of adjusting device for an objective of a photographic apparatus is illustrated by way of example in the accompanying drawings as applied to a photographic camera:

Fig. 3 is an enlarged view of the focusing device in the position occupied just before the objective reaches the infinity position.

Fig. 4 is a view similar to Fig. 3 but showing the device at the infinity position.

Fig. 5 is a side elevation of Fig. 4 looking in the direction of the arrow.

Fig. 6 illustrates in a similar view to Fig. 4 the focusing device at the position occupied at the beginning of the focusing adjustment of the objective from the infinity position.

Fig. 7 is a side elevation corresponding to Fig. 6 looking in the direction of the arrow.

Fig. 8 illustrates the focusing device in the position occupied for the closest distance for which the objective can be focused.

Fig. 9 is a side elevation corresponding to Fig. 8.

In all the figures of the drawings similar parts are designated with the same reference numerals.

Figure 1:
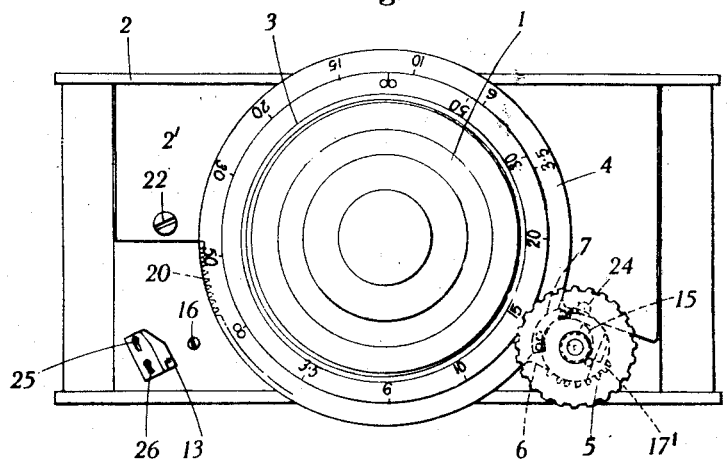
Fig. 1 is a front elevation of the camera showing a focusing device in a rest position in which for example the camera objective is retracted towards or telescoped onto the camera body.

Referring to Fig. 1 an externally screw-threaded objective mount is adapted to telescope into the front wall 2' of the camera body 2. The objective mount 1 is surrounded by a ring 3 fixed relatively to the front 2', said ring preferably being flanged so that a focusing ring 4 surrounding and operatively connected by internal screw threads with the external screw threads of the mount 1 overlies the flanged portion of the ring 3. The ring 4 is rotatably carried by the front wall 2' of the camera body 2, but is prevented in known manner from moving axially with respect thereto. The fixed ring 3 and the rotatable focusing ring 4 each carry a scale graduated to cover a focusing from "infinity" to the nearest position, e. g., 3½ feet. The focusing ring 4 is provided with an operating knurled knob 5 rotatably carried by a lug 6 extending radially from the ring 4. When the ring 4 is rotated, the objective mount 1 is adapted, in known manner, to execute an axial but non-rotatable movement relatively to the camera body 2. From the rest position, the ring 4 can be rapidly moved to the picture-taking or infinity position by using the knob 5 as a handle and turning the ring so as to bring the focusing knob 5 from the position illustrated in Fig. 1 to the position illustrated in Fig. 2 at which the objective is at the infinity or picture-taking position.

Figure 2:
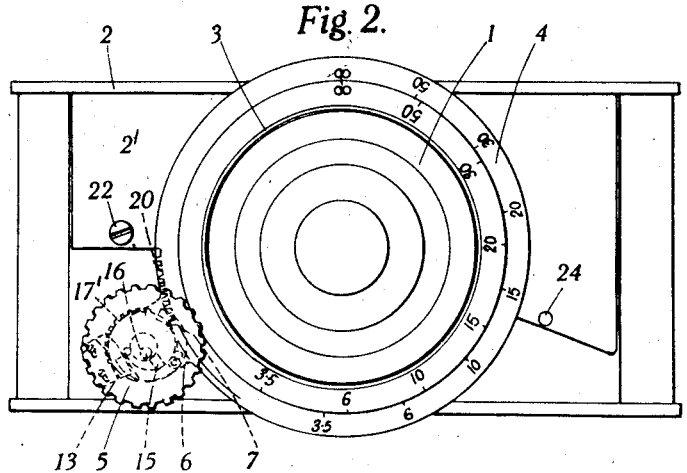
Fig. 2 is a view similar to Fig. 1 but showing the focusing device in the infinity or picture-taking position of the objective.

Means are provided whereby during movement of the focusing knob 5 from the position illustrated in Fig. 1 to the position of Fig. 2, it is prevented against rotation, such means being rendered inoperative automatically when the knob 5 reaches the infinity position. The locking means illustrated by way of example comprises a flat helical spring 7 secured at one end by rivets 8 to the under-surface of the knob 5, the other end of the spring being free where it bears against a pin 9 projecting upwardly from the lug 6. In the movement of the knob 5 to the infinity position counter-clockwise rotation thereof is prevented by the engagement of a pin 10, conveniently serving as a guide pin for the spring 7 bearing against a further pin 11 projecting upwardly from the lug 6.

Just before the knob 5 reaches the infinity position the free end 12 of the spring 7 rides on a curved member 13 secured to the front wall 2' of the camera body. A recess 14 is formed in the lug 6 to permit the curved member 13 to pass under the spring 7. The arcuate movement of the knob 5 about the axis of the objective is arrested by the engagement of a projection 15 with a fixed infinity stop 16 on the front wall 2' of the camera body. The projection 15 extends downwardly from a disc 17 secured to the lower end of a sleeve 18 rotatably carried in the lug 6 and to which the knob 5 is secured as by a screw 19. At this stage, the parts are in the position illustrated in Figs. 4 and 5. Upon further operation of the knob 5, the spring 7 rides further up on the curved member 13 and is thereby lifted clear of the locking pin 9. The parts are then moved by rotation of knob 5 into the position illustrated in Figs. 6 and 7 where it will be seen that a toothed part 17' of the disc 17 is just engaging with a toothed segment 20 formed on the flanged portion of the fixed ring 3. If desired, the toothing on the disc 17 and segment 20 can be omitted and the disc can then be operated as a friction disc. Upon this rotation of the knob 5, the projection 15 moves away from the stop 16 and the ring 4 may thus be rotated further in the clock-wise direction for focusing the objective as desired through the full focusing range from the infinity position to the nearest distance position, e. g., 3½ feet. This latter position is illustrated in Figs. 8 and 9, which show an edge 21 of the lug 6 bearing against a screw 22 secured to the front wall 2' of the camera body 2.

It will be seen that during this movement, the ring 4 will have turned further in a clock-wise direction and the 3.5 graduation thereon will be in register with the corresponding graduation on the scale on the fixed ring 3. From inspection of Fig. 2, it will be observed that when the ring 4 has ben rotated to the infinity position, the angular displacement between corresponding graduations on the two scales for the remaining distance readings increases as the distance decreases. Consequently, only a very small rotation of the knurled knob 6 is necessary to bring the "50 feet" graduations on the two scales into register, but the extent of this rotation progressively increases through the remainder of the focusing range, until for the nearest distance (3.5), the full range of the segment 20 and of the toothed part 17' of the disc 17 is utilised. It will thus be appreciated from the foregoing that the initial swinging movement of the knob 5 from the rest position rapidly moves the objective to the infinity position and that the subsequent rotation of the knob through an angle of about 120° effects a fine focusing movement of the ring 4 to adjust the objective from the infinity position to the nearest distance.

In order to restore the focusing mechanism to the rest position illustrated in Fig. 1, the knob 5 is first turned in an anti-clockwise direction, thereby causing the ring 4 and the knob 5 to resume the positions illustrated in Figs. 4 and 5. At the end of this rotational movement of the knob 5, the spring 7 rides off the curved member 13 and snaps behind the pin 9. At this point the pin 10 projecting downwardly from the knob 5 bears against the upstanding pin 11 on the lug 6 and thus further anti-clockwise rotation of the knob is prevented. The knob 5 can now be used as a handle to rotate the ring 4 into the rest position illustrated in Fig. 1. In this position the edge 23 of the lug 6 bears against a stop 24 secured to the front wall 2' of the camera body 2.

The curved member 13 may be adjustably supported as for instance on screws 25 which extend through slots 26 in the member and are screwed into the front wall 2' of the camera body 2. This adjustment means permits the position of the curved member to be accurately adjusted so that the locking device for the focusing knob 5 can be rendered inoperative when the objective has been moved by rotation of ring 4 to the infinity position.

Modifications of the invention may be accomplished without departing from the spirit thereof, so that the embodiment hereinbefore described is to be regarded only in an illustrative sense, subject to the limitation of the appended claims.

Having now particularly described my invention what I desire to secure by Letters Patent of the United States and what I claim is:

1. In a photographic camera the combination with a camera body, an objective movable with respect to said body, and means including an annular adjusting member for adjusting said objective, of a rotatable operating member connected with said annular member, locking means for preventing rotation of said operating member, whereby it can be used as a handle to rotate said annular member and adjust said objective from a rest position to an infinity position, teeth on the camera and handle positioned to be engaged when in predetermined positions and means for releasing said locking member when the objective is at said infinity position, whereupon the teeth on the camera and handle may be engaged whereby said operating member can be rotated to effect focusing adjustment of said annular member.

2. In a photographic camera the combination with a camera body, an objective movable with respect to said body, and means including an annular adjusting member for adjusting said objective, of a rotatable operating member connected with said annular member, locking means for preventing rotation of said operating member, whereby it can be used as a handle to rotate said annular member and adjust said objective from a rest position to an infinity position, teeth on the camera and handle positioned to be engaged when in predetermined positions and cam means carried by said camera body for releasing said locking means when the objective is at said infinity positon, whereupon the teeth on the camera and handle may be engaged so that said operating member can be rotated to effect focusing adjustment of said annular member.

3. In a photographic camera the combination with a camera body, an objective movable with respect to said body, and means including an annular adjusting member for adjusting said objective, of a rotatable operating member connected with said annular member, a toothed member mounted to rotate with said operating member, a toothed segment secured to said camera body, locking means for preventing rotation of said operating member, whereby it can be used as a handle to rotate said annular member and adjust said objective from a rest position to an infinity position, and means for releasing said locking member when the objective is at said infinity position, whereupon said operating member can be rotated to operatively engage said toothed segment for effecting focusing adjustment of said annular member.

4. In a photographic camera the combination with a camera body, an objective movable with respect to said body, and means including a toothed annular adjusting member for adjusting said objective, of a rotatable operating member connected with said annular member, a toothed member mounted to rotate with said operating member, a toothed segment secured to said camera body, locking means for preventing rotation of said operating member, whereby it can be used as a handle to rotate said annular member and adjust said objective from a rest position to an infinity position, and cam means carried by said camera body for releasing said locking member when the objective is at said infinity position, whereupon said operating member can be rotated to operatively engage said toothed segment for effecting focusing adjustment of said annular member.

5. In a photographic camera the combination with a camera body, an objective, an objective mount movably connected with said body, and means including an annular ring surrounding said objective mount for adjusting said objective, of a knurled knob rotatably connected to said annular member, cooperating locking parts between said knob and annular member for preventing rotation of said knob during one type of movement of the latter from a rest position to the infinity position of said camera objective, teeth carried by the camera and knob and positioned to engage and means for automatically removing the locking engagement between said parts when said knob approaches said infinity position, whereupon said teeth on the camera and knob may be engaged and said knob can be operated through another type of movement to effect focusing of said objective.

6. In a photographic camera the combination with a camera body, an objective, an objective mount movable with respect to said body, and means including an annular ring surrounding said objective mount for adjusting said objective, of a knurled knob rotatably connected to said annular member, a helical spring secured at one end to said knob, a projection carried by said annular member for engagement by the free end of said helical spring, whereby rotation of said knob is prevented during a swinging movement thereof to operate said annular member to effect adjustment of said objective into a picture-taking position, teeth on the camera and knob positioned to be engaged, and means for automatically removing the locking engagement between said spring and projection when said knob approaches said infinity position, whereupon the teeth on the camera and knob may be engaged by rotating the knob to effect focusing of said objective.

7. In a photographic camera the combination with a camera body, an objective, an objective mount movable with respect to said body, and means including an annular ring surrounding said objective mount for adjusting said objective, of a knurled knob rotatably connected to said annular member, a helical spring secured at one end to said knob, a projection carried by said annular member for engagement by the free end of said helical spring, whereby rotation of said knob is prevented during a swinging movement thereof to operate said annular member to effect adjustment of said objective into a picture-taking position, and cam means carried by said camera body for flexing said spring out of locking engagement with said projection when said knob approaches said infinity position, teeth on the camera and knob positioned to be engaged by turning the released knob whereupon said knob can be rotated to effect focusing of said objective.

8. In a photographic camera the combination with a camera body, an objective, an objective mount movable with respect to said body, and means including an annular ring surrounding said objective mount for adjusting said objective, of a knurled knob rotatably connected to said annular member, a helical spring secured at one end to said knob, a projection carried by said annular member for engagement by the free end of said helical spring, whereby rotation of said knob is prevented during a swinging movement thereof to operate said annular member to effect adjustment of said objective into a picture-taking position, a projection carried by said knob, a further projection carried by said annular member for engagement with said knob projection to prevent back rotation of the latter during its swinging movement, and means for automatically removing the locking engagement between said spring and cooperating projection when said knob approaches said infinity position, teeth on the camera and knob positioned to be engaged by turning the released knob whereupon said knob can be rotated to effect focusing of said objective.

9. In a photographic camera the combination with a camera body, an objective, an objective mount movable with respect to said body, and means including an annular ring surrounding said objective mount for adjusting said objective, of a knurled knob rotatably connected to a lug of said annular member, a helical spring secured at one end to said knob, a projection carried by said annular member for engagement by the free end of said helical spring, whereby rotation of said knob is prevented during a swinging movement thereof to operate said annular member to effect adjustment of said objective into a picture-taking position, a projection carried by said knob, a further projection carried by said annular member for engagement with said knob projection to prevent back rotation of the latter during its swinging movement, and cam means carried by said camera body for flexing said spring out of locking engagement with said first mentioned projection when said knob approaches said infinity position, interengageable parts on said camera and on said knob adapted to be engaged by turning the released knob, whereupon said knob can be rotated to effect focusing of said objective.

10. In a photographic camera the combination with a camera body, an objective, an objective mount movable with respect to said body, and means including an annular ring surrounding said objective mount for adjusting said objective, of a knurled knob rotatably connected to said annular member, a helical spring secured at one end to said knob, a projection carried by said annular member for engagement by the free end of said helical spring, whereby rotation of said knob is prevented during a swinging movement thereof to operate said annular member to effect adjustment of said objective into a picture-taking position, a stop carried by said camera body for limiting said swinging movement of said knob, and means for automatically removing the locking engagement between said parts when said knob approaches said infinity position, means carried by the camera and knob and engaged by turning the released knob, whereby said knob can be rotated to effect focusing of said objective.

11. In a photographic camera the combination with a camera body, an objective, an objective mount movable with respect to said body, and means including an annular ring surrounding said objective mount for adjusting said objective, of a knurled knob rotatably connected to a lug of said annular member, a helical spring secured at one end to said knob, a projection carried by said annular member for engagment by the free end of said helical spring, whereby rotation of said knob is prevented during a swinging movement thereof to operate said annular member to effect adjustment of said objective into a picture-taking position, a projection carried by said knob, a further projection carried by said annular member for engagement with said knob projection to prevent back rotation of the latter during its swinging movement, and a curved plate member adjustably carried by said camera body for flexing said spring out of locking engagement with said first mentioned projection when said knob approaches said infinity position, and gear segments on said camera body and knob positioned to be engaged by turning said released knob whereupon said knob can be rotated to effect focusing of said objective.

12. In a photographic camera the combination with a camera body, an objective, an objective mount movable with respect to said body, and means including an annular ring surrounding said objective mount for adjusting said objective, of a knurled knob rotatably connected to a lug of said annular member, a helical spring secured at one end to said knob, a projection carried by said annular member for engagement by the free end of said helical spring, whereby rotation of said knob is prevented during a swinging movement thereof to operate said annular member to effect adjustment of said objective into a picture-taking position, a projection carried by said knob, a further projection carried by said annular member for engagement with said knob projection to prevent back rotation of the latter during its swinging movement, a curved plate member adjustably carried by said camera body for flexing said spring out of locking engagement with said first-mentioned projection when said knob approaches said infinity position, interengaging members carried by the camera and the knob engageable by turning said released knob whereby said knob can be rotated to effect focusing of said objective, and abutment surfaces on said camera body for engagement by said lug on said annular member for defining the rest position of said knob and also the end of the focusing movement thereof.

WILHELM LINDENBERG.